United States Patent [19]

Courten et al.

[11] 4,191,471

[45] Mar. 4, 1980

[54] AIRCRAFT ARMAMENT ALIGNMENT

[75] Inventors: Henry C. Courten, Commack; Joseph P. Mattal, Smithtown, both of N.Y.

[73] Assignee: Grumman Aerospace Corporation, Bethpage, N.Y.

[21] Appl. No.: 256,421

[22] Filed: May 24, 1972

[51] Int. Cl.² .................. G01B 11/26; G01C 1/06
[52] U.S. Cl. .................... 356/154; 356/142; 356/153
[58] Field of Search ............. 356/138, 139, 142, 153, 356/154, 155, 172; 33/286

[56] References Cited

U.S. PATENT DOCUMENTS

| 2,305,775 | 12/1942 | Hansen | 356/154 |
| 2,405,441 | 8/1946 | Martin | 356/138 |
| 3,480,367 | 11/1969 | Husted et al. | 356/138 |
| 3,734,627 | 5/1973 | Edwards | 356/153 |

*Primary Examiner*—S. C. Buczinski
*Attorney, Agent, or Firm*—Mellor A. Gill

[57] ABSTRACT

An alignment device for aligning the boresight axis of armament with the line-of-sight axis of an optical sight including a novel collimating apparatus for field use. The collimating apparatus includes a collimator and a collimated light beam generator. The collimator includes an objective lens having its optical axis parallel to one of the axes to be aligned, a translucent screen for rear projection and a projection lens between the objective lens and the screen. A remote collimated light beam generator includes a battery energized incandescent light bulb, a projection reticle, and an objective lens for collimating the light source, the optical axis of the lens being parallel to the second of the axes to be aligned. The angular displacement between the axes is indicated by the position of a light spot on the screen. The apparatus also includes fittings whereby the light beam generator is temporarily attached to the collimator housing in known relationship for checking the alignment of the optical elements by observing the position of the light spot on the screen.

6 Claims, 7 Drawing Figures

AIRCRAFT ARMAMENT ALIGNMENT

FIELD OF THE INVENTION

This invention relates to alignment devices for aircraft armament and has particular reference to collimators used therefor.

DISCUSSION OF THE PRIOR ART

The weapons of military aircraft are trained on the target by maneuvering the aircraft into firing position. Accuracy in destroying the target demands that precisely known angular relationships exist between the alignment of the sight used by the pilot and the alignment of the weapon with respect to a predetermined aircraft datum line. The orientation of the datum line is precisely known with respect to reference surfaces of a bracket which is permanently affixed to the aircraft during its manufacture. The angular relationships between the weapon boresight, the datum line, and the line of sight of the optical sight are dictated by the characteristics of the weapons employed and by the pilot's personal preference (as related to the tactics he employs) and generally never result in an exact alignment of the optical sight's axis and the boresight of the weapon.

The alignment of the weapon's boresight must be checked regularly to insure that accuracy of the fire control system is maintained. Also, as pilots and weapons are changed, the boresight of the weapon and line of sight of the optical sight must be re-aligned to conform with the new conditions of use. The present invention is a simple device for precisely aligning the weapon and the optical sight using a novel collimator and a reference axis transfer jig.

Autocollimators of one sort or another have been employed in prior alignment schemes but none of those autocollimators possess the features of the present one. In this invention, a light beam parallel to the weapon's boresight axis is focused on the rear of a translucent screen through a projection lens system, the alignment of the optical axis of the projection lens with respect to the aircraft datum line being known. Any misalignment of the two axes is evidenced by a displacement of the bright spot from the index point, generally at the center of the screen. The distance by which the spot is displaced from the index point is a measure of misalignment, and adjustment of the weapon's supporting mount will permit any desired degree of misalignment to be introduced by observing the position of the spot on the screen.

The proper use of this device can be learned by unskilled operators in a matter of hours, whereas the proper use of prior devices for similar purposes could be mastered by relatively skilled operators only after intensive training.

SUMMARY OF THE PRESENT INVENTION

In this invention the light beam is generated by a simple battery-energized incandescent light bulb, and is collimated through a pin hole aperture and collimating lens system. In one embodiment, the light source is contained in the remote unit, which has a mandrel portion fitting into the bore of the tube whose axis is to define the line of the collimated light beam. In another embodiment, the light source is contained in collimator unit and the remote unit consists of a mirror (for reflecting the light beam back to the collimator) attached to a mandrel portion.

For use in the field, where optical laboratory facilities are unavailable, a self-contained checking and calibration system is provided. The remote unit is threaded onto the collimator unit and the position of the spot on the screen is observed. If off-center, minor adjustments can be made; or either unit can be replaced with another and the defective unit returned to a repair station.

It is therefore one object of this invention to provide an alignment system for armament and ordinance and similar sights using simple, economical, rugged components with readily available replacement parts.

It is another object of this invention to provide an alignment system which is readily operated by relatively unskilled operators after a brief training session.

It is yet another object of this invention to provide an alignment system which can be checked and calibrated in the field without the support of a sophisticated optical laboratory. All of the objects and features contribute to the economy of the system and are met by this invention without compromising the accuracy of measurement.

BRIEF DESCRIPTION OF THE DRAWINGS

For a more complete description of the invention, reference may be made to the accompanying drawings in which.

DESCRIPTION OF THE PREFERRED EMBODIMENTS

Figure 1:
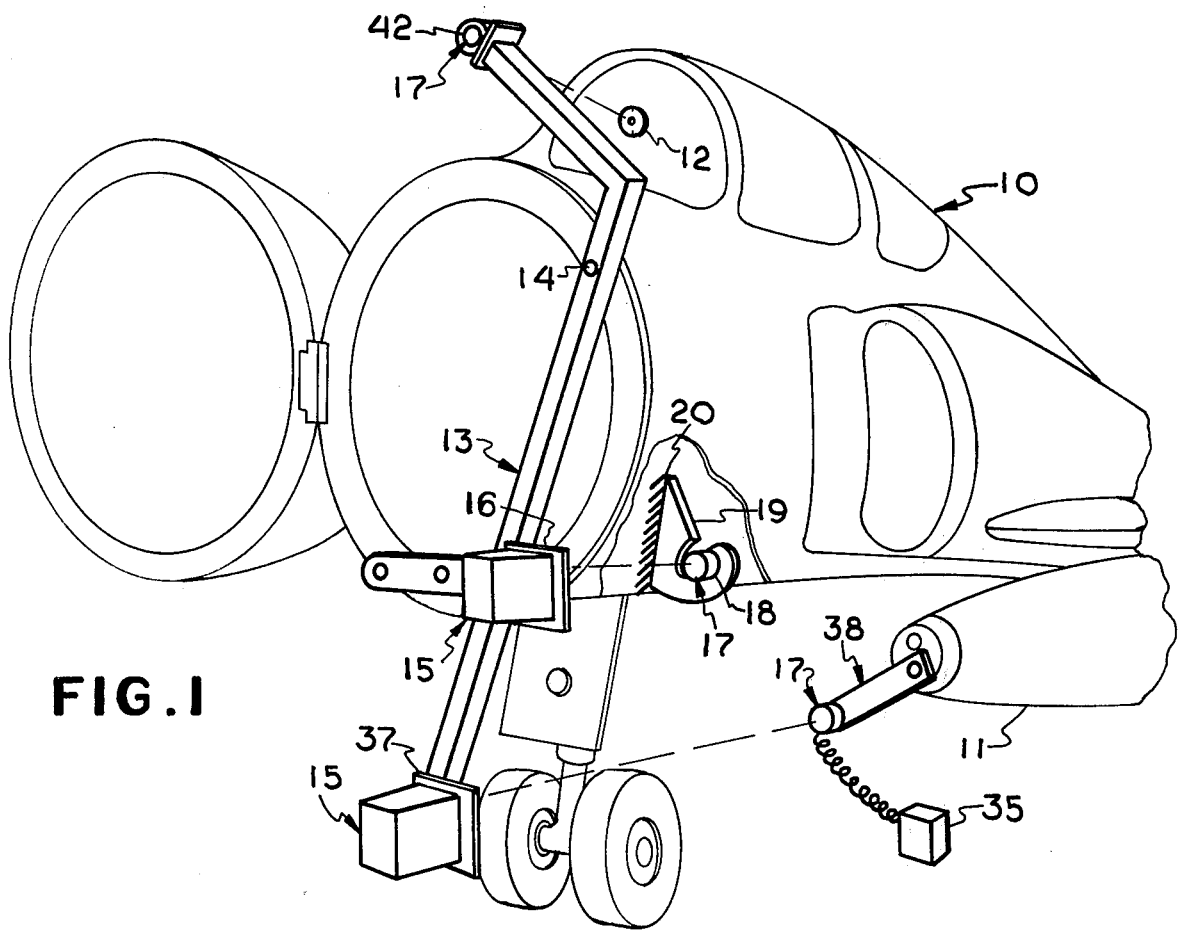
FIG. 1 is an overall view showing how the alignment of the various axes is accomplished.

With reference now to FIG. 1 of the drawings, there is shown a portion of an aircraft 10 having mounted on it a gun, or gunpod, 11 and an optical sight 12. In action, the pilot views the target through the optical sight 12 and maneuvers the aircraft until the target is aligned with the cross hairs or other reference lines of the optical sight 12; and fires a weapon from the gunpod 11 at the target. If the gunpod is correctly mounted on the aircraft 10, the boresight of the gun will be trained at the target with appropriate corrections for lead angle and weapon ballistics. This will be insured only if the optical sight 12 and the boresight of the gun are properly aligned (or misaligned by a known degree).

This alignment is accomplished by the present invention in the manner to be explained in the following description. In order to accomplish this alignment, a transfer jig 13 is temporarily secured to the frame of the aircraft 10 by fasteners 14. The orientation of the jig 13 is initially adjusted to a known attitude with respect to a reference datum line in the aircraft, and the orientations of the optical sight 12 and gunpod 11 are then adjusted with respect to reference surfaces in the jig 13 as will be described.

Figure 2:
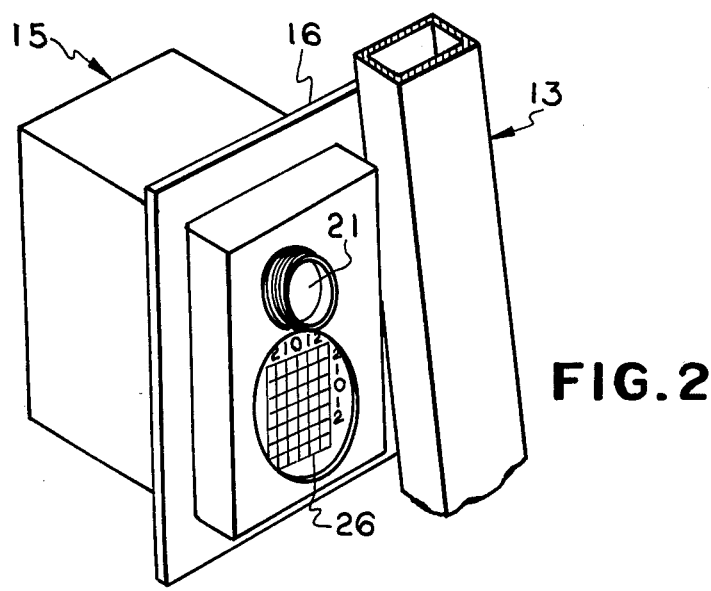
FIG. 2 shows a detail of FIG. 1 from another angle.

In initially setting up the jig 13 on the aircraft 10, a collimator 15 is secured to a frame 16 jutting out from jig 13 as seen more clearly in FIG. 2. A collimated light source 17 is placed in the socket 18 of a bracket 19 which is attached to a reference surface 20 in the frame of the aircraft 10. The reference surface 20 defines an aircraft datum line and the bracket 19 is so designed that the axis of the collimated light source 17 is parallel to the longitudinal datum line, e.g., longitudinal or fore-and-aft centerline of the aircraft 10.

Figure 3:
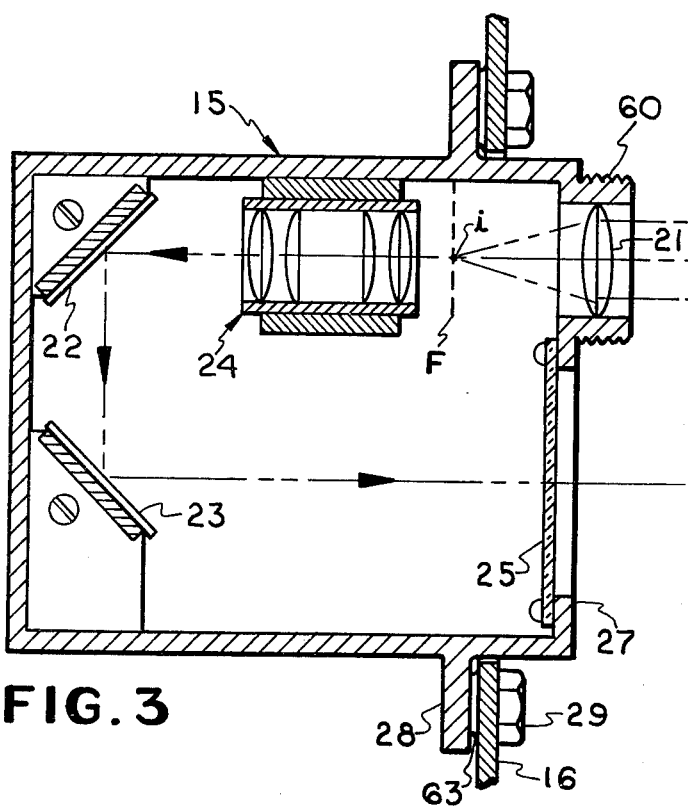
FIG. 3 is a sectional view of the collimator of this invention.

The collimator 15, shown in section in FIG. 3, comprises an objective lens 21; front surface mirrors 22, 23; a projection lens system 24; and a translucent screen 25 with grid markings 26 thereon, all mounted securely to the housing 27. The housing 27 also includes mounting lugs 28 which receive the bolts 29 holding the housing 27 in frame 16. The mounting lugs 28 also define a surface to which the other elements in the collimator 15 are referred during fabrication, and which in turn insures accurate repetition of the alignment of the optical axis of the lens 21 with respect to the jig 13 whenever the collimator 15 is mounted thereon.

Figure 4:
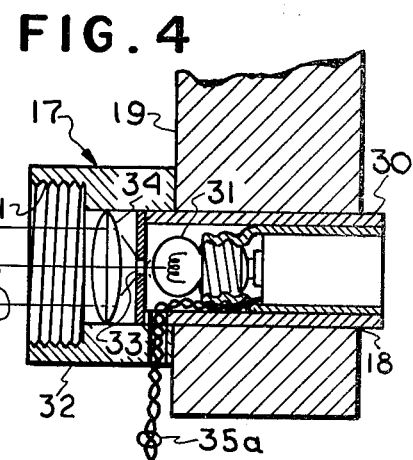
FIG. 4 is a sectional view of the light source used with the collimator of FIG. 3.

The collimated light source 17, shown in FIG. 4, comprises a mandrel 30, a light bulb 31, and a cover 32 with a pinhole 33 and collimating lens 34 therein. An external power pack 35 supplies power to the light bulb 31 by means of conductors 35a. The mandrel 30 fits snugly within socket 18 of bracket 19 and the light beam 36 emanating from lens 34 is a collimated beam parallel to the axis of socket 18, i.e., parallel to the aircraft datum line.

The light beam 36 entering lens 21 of the collimator 15, is projected on screen 25 by means of the projection lens 24 and mirrors 22, 23. If the jig 13 is oriented so as to be perpendicular to the light beam 36, the spot of light appearing on the screen 25 will be at the center of the grid 26 or some other reference point. If not, the spot will be off center and the jig 13 orientation must be adjusted, as by adjusting fasteners 14, until the light spot is at the grid 26 center. At this time the orientation of the jig 13 is correct for the next step.

The representations in FIGS. 3 and 4 are merely schematic and no attempt is made to limit the actual construction of the device which may take many physical forms within the overall guide-lines inherent in the schematic description.

Furthermore it should be realized that the diagrams are illustrative of the principle only and that the dimensions and sizes shown in the figures bear no relation to the true construction. The elements as shown may be somewhat distorted but are held to a minimum in the interest of brevity and clarity. For example, the objective lens must focus the incoming beams at the focal plane of the projection lens, physically some distance in front of the projection lens. It may be necessary to bend the light path from the lens 21 to projection lens system 24 by well-known optical means in order to keep the outer dimensions of the collimator casing reasonably small. Similarly, the path between the projection lens 24 and screen 25 may go through more than the two bends effected by mirrors 22 and 23. The lenses 21 and 34 may be comprised of several elements, while the lens elements of the projection lens 24 may take many forms different from those shown.

The optical characteristics of the components for collimator devices are well known; the collimated light beam is produced by having the point source of light at the principal focus of a converging lens, i.e., the pinhole 33 is at the principal focus of lens 34. The lens 21 receives the collimated beam and creates an image, i, at its focal plane, F, which is also the object plane for the projection lens 24. So long as the incoming collimated beam is parallel to the optical axis of the lens 21, the image, i, will be on the optical axis. Thus, lateral displacement of the light source 17 will not cause the image, i, to be displaced from the optical axis. It will only result in a diminution of the light energy received and a somewhat less bright image.

When the incoming beam is angularly displaced with respect to the optical axis of lens 21, the image, i, is displaced from the optical axis by an amount indicative of the magnitude of the angular displacement. The projection lens 24 projects the image, i, on the screen 25, whence the displacement of the image, i, shows up as a magnified displacement of a light spot from the zero reference on the screen 25.

Figure 5:
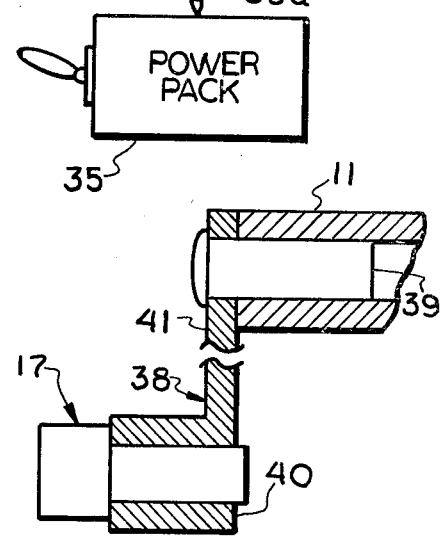
FIG. 5 illustrates an adapter for the light source of FIG. 4.

The collimator 15 is moved to a lower reference frame 37 on jig 13, and the light source 17 is moved to the bore of gun pod 11, or to the socket of an adapter 38, if necessary, to bring the light beam 36 to bear on the collimator 15. The adapter 38, as perhaps best shown in FIG. 5, includes a mandrel portion 39, a socket portion 40, and an intermediate arm 41 connecting the portions 39 and 40, and maintaining the axis of socket 40 parallel to the axis of the mandrel 39. The arm 41 may be fixed in length if used only in specific, prescribed locations, but it may be made adjustable in length for universal application of the adapter 38.

The mounting of the gunpod 11 is adjusted until the light spot seen at the screen 25 is in the desired position, indicating that the desired angle between the aircraft datum line and the gun boresight has been established. The spot on the screen is easily visible from the position of the gunpod 11, so that the technician working at the gunpod 11 location does not need the services of another man to read the collimator 15.

Finally, the collimated light source 17 is moved to the socket 42 at the upper end of the jig 13, pointing so that the light beam 36 is directed toward the optical sight 12 generally of the well-known HUD (Heads-Up Display) type. The technician adjusts the optical sight 12 until its line-of-sight is parallel to the aircraft datum line. Thus the collimated light source 17 serves two separate purposes. In this latter function it produces an image at infinity for matching with the "Pipper" of the optical sight.

Figure 6:
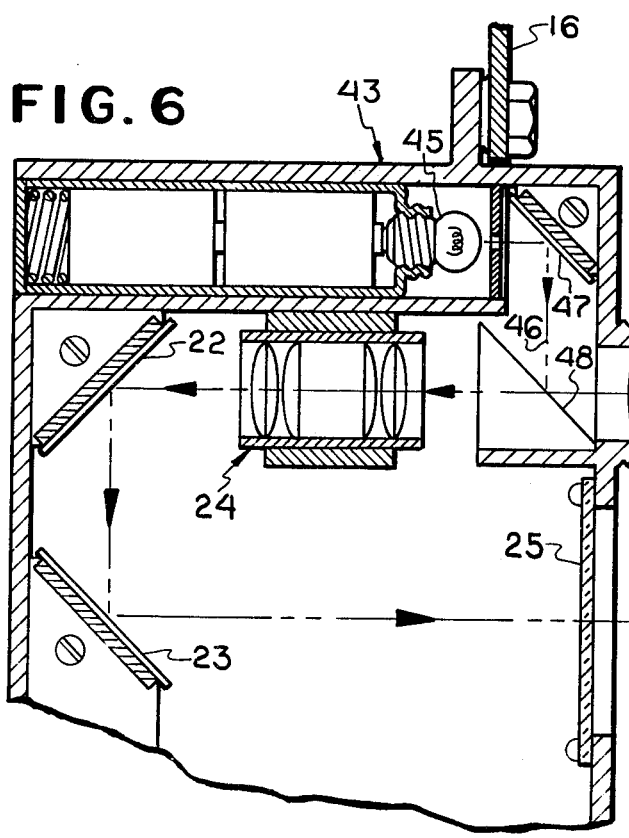
FIG. 6 is a sectional view of an autocollimator.
Figure 7:
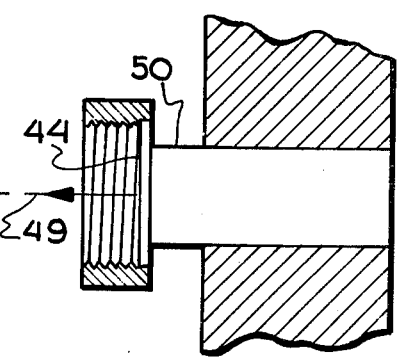
FIG. 7 illustrates a reflector for use with the autocollimator of FIG. 6.

The collimator 15 having been described as shown in FIG. 3, and the light source as shown in FIG. 4, may be replaced by the autocollimator 43 and reflecting mirror 44, shown in FIGS. 6 and 7, respectively, if desired. The autocollimator 43 contains the lens 21, projection lens system 24, mirrors 22 and 23, and screen 25 as in collimator 15, but in addition, has a self contained collimated light source. The collimated light beam 46 from bulb 45 is deflected by mirror 47 and beam splitter 48, through lens 21, to the surface of the mirror 44, from which the beam 49 returns through lens 21, beam splitter 48, and optical elements 24, 22, and 23, to the screen 25. The mandrel 50 to which mirror 44 is attached is positioned within the various sockets, as described in connection with the light source 17.

Both collimator embodiments, shown in FIGS. 3 and 6, include a projection lens system 24 between the objective lens 21 and screen 25. The purpose of the projection lens is to magnify the linear displacement of the light spot on the screen 25 for any angular displacement between the optical axis of the collimator and the entering light beam 36 or 49. By changing the projection lens to one of a different focal length, the scale of the deflection in screen 25 can be changed. Also, the collimators 15 and 43 each use the same type of translucent screen 25 through which the light spot is transmitted, rather than an opaque screen from which the light spot would be reflected. This arrangement promotes greater illumination on the screen permitting use of the device in bright daylight.

It will be understood that for a given misalignment between the optical axis of the collimator and the boresight of the socket holding the mandrel 30, 39, or 50, the angular displacement of the collimated beam 36 from light source 17 with respect to the optical axis of collimator 15, will be one-half the angular displacement of the beam 49 deflected from the mirror 44 with respect to the optical axis of collimator 43.

As seen in FIGS. 3 and 4, the collimator 15 is provided with an outwardly projecting externally threaded collar 60 surrounding the lens 21 and the light source 17 is provided with an internally threaded collar 61 in front of the lens 34. By mating the collar 61 on collar 60, the alignment of the optical system can be checked. If the light spot seen on screen 25 is within an established region, the system alignment is acceptable. If not, the screen 25 or mirrors 22, 23 of the collimator can be adjusted as required.

A second check is obtained by mounting the mandrel 30 of light source 17 (when collars 60, 61 are mechanically disengaged) in support such as an X-block with the lens 34 opposite lens 21 of the collimator. When the mandrel 30 is rotated, the light spot seen on screen 25 must not wander. If the spot does move it will indicate a misalignment between the collimated light beam and the mandrel 30, and the unit 17 must be replaced.

Similar checks can be made with the autocollimator and mirror arrangement shown in FIGS. 6 and 7.

A final check of the apparatus involves checking of the jig 13 on a surface plate to insure proper alignment of the mounting pads 63 on frame 16 as shown in FIG. 3, to which the collimator 15 or 24 is attached. These pads 63 may be threaded inserts in frame 16 for ease of adjustment or any other suitable arrangement can be utilized.

The invention having been described with reference to specific examples, should not be limited by the description since many variations and modifications are possible, but should be limited only by the terms of the appended claims.

What we claim is:

1. Apparatus for aligning the boresight axis of a weapon carried by an aircraft with respect to a reference axis on said aircraft including
    a collimator comprising a housing, an objective lens, a translucent screen, a reticle on said screen, and optical elements between said lens and said screen mounted in said housing, the angular relationship between the optical axis of said objective lens and a collimated light beam received by said lens being indicated by the position of a light spot in said reticle,
    means for generating a collimated light beam,
    a jig temporarily and adjustably attachable to said aircraft,
    said jig having first and second supporting means for alternatively supporting said collimator at first and second spaced-apart locations thereon,
    first retaining means for retaining said collimated light-generating means on said aircraft so that said collimated light beam is parallel to said reference axis and directed toward the first location on said jig,
    second retaining means for retaining said collimated light generating means on said weapon so that said collimated light beam is parallel to said boresight axis, and directed toward the second location on said jig,
    whereby, with the light generating means in the first retaining means, the collimator at the first location on said jig, and the jig adjusted so that the light spot on the reticle indicates that the optical axis of said lens is aligned with respect to said reference axis, said jig will be in known relationship with respect to said reference axis and
    with the light-generating means subsequently moved to the second retaining means and the collimator moved to the second location on said jig and the weapon adjusted so that the light spot on the reticle indicates that the boresight axis is aligned in a known relationship with respect to said optical axis of said lens, the weapon boresight axis is aligned at a known relationship with respect to said aircraft reference axis.

2. Apparatus as described in claim 1 wherein said first and second retaining means on said jig each includes a surface for mounting said collimator housing, such that the optical axis of the objective lens at the first location in parallel to the optical axis of the objective lens at the second location.

3. Apparatus as described in claim 1 wherein said optical means interposed between said lens and said screen includes a projection lens.

4. Apparatus as described in claim 1 wherein said frame also includes third retaining means for said collimated light generating means whereby said collimated light beam is directed toward the optical sight of the weapon control system when said light generating means is in said third retaining means, whereby the line-of-sight of said optical sight can be adjusted into known relationship with said weapon boresight axis.

5. Apparatus as described in claim 1 wherein said means for generating the collimated light beam includes an incandescent light bulb a condensing lens and means for energizing said light bulb.

6. Apparatus as described in claim 1 wherein said means for generating the collimated light beam includes a reflecting mirror.

* * * * *